(12) United States Patent
Dubrovsky et al.

(10) Patent No.: US 7,738,380 B1
(45) Date of Patent: Jun. 15, 2010

(54) REASSEMBLY-FREE REWRITING OF OUT-OF-ORDER DATA PAYLOAD

(75) Inventors: Aleksandr Dubrovsky, San Mateo, CA (US); Roman Yanovsky, Los Altos, CA (US); Boris Yanovsky, Saratoga, CA (US)

(73) Assignee: SonicWALL, Inc., San Jose, CA (US)

( * ) Notice: Subject to any disclaimer, the term of this patent is extended or adjusted under 35 U.S.C. 154(b) by 252 days.

(21) Appl. No.: 11/772,723

(22) Filed: Jul. 2, 2007

(51) Int. Cl.
*H04L 12/56* (2006.01)
(52) U.S. Cl. ........................ 370/235; 370/394; 370/474; 370/476
(58) Field of Classification Search .................. 370/394, 370/474, 411–419; 726/3
See application file for complete search history.

(56) References Cited

U.S. PATENT DOCUMENTS 7,304,996 B1 * 12/2007 Swenson et al. ............ 370/394

2002/0083331 A1 * 6/2002 Krumel ...................... 713/200

* cited by examiner

*Primary Examiner*—Chi H. Pham
*Assistant Examiner*—Shick Hom
(74) *Attorney, Agent, or Firm*—Blakely, Sokoloff, Taylor & Zafman LLP

(57) ABSTRACT

Techniques for reassembly-free rewriting of out-of-order data packet payload are described herein. In one aspect of the invention, in response to packets received at a network access device from a first network node destined to a second network node, the packets are stored in a buffer within the network access device if the packets need to be modified before sending the packets to the second network node. The original our-of-order packets are dropped and do not reach the second network node. The payloads of the packets stored in the buffer are modified and thereafter, the modified packets with the modified payloads are sent to the second network node. Other methods and apparatuses are also described.

14 Claims, 5 Drawing Sheets

REASSEMBLY-FREE REWRITING OF OUT-OF-ORDER DATA PAYLOAD

FIELD OF THE INVENTION

The present invention relates generally to content scanning. More particularly, this invention relates to reassemble-free rewriting of our-of-order data payload.

BACKGROUND

Today, in many security products, pattern matching is used to prevent many types of security attacks. For example, some existing desktop virus scanning may include scanning files against certain recognizable patterns. These files usually come from mail attachments and website downloads. These desktop applications are simpler in that by the time the pattern matching is performed, the input has been all accumulated in the correct order. The situation is more complicated for gateway products, such as firewalls, attempting to match patterns for other purposes, such as deep packet inspection. Some of these products scan for patterns over Transport Control Protocol (TCP) packets. Since TCP usually breaks down application data into chunks called TCP segments, the full pattern may reside in several TCP segments. One conventional approach is to reassemble all TCP packets together into one large chunk and perform pattern matching on this chunk, similar to scanning files.

Another major problem in pattern matching is that the packets may arrive out of order. Again, using TCP as an example, the application data is broken into what TCP considers the best sized chunks to send, called a TCP segment or a TCP segment. When TCP sends a segment, it maintains a timer and waits for the other end to acknowledge the receipt of the segment. The acknowledgement is commonly called an ACK. If an ACK is not received for a particular segment within a predetermined period of time, the segment is retransmitted. Since the IP layer transmits the TCP segments as IP datagrams and the IP datagrams can arrive out of order, the TCP segments can arrive out of order as well. Currently, one receiver of the TCP segments reassembles the data if necessary, and therefore, the application layer receives data in the correct order.

One approach is to reassemble at run-time the out-of-order packets for pattern scanning purposes and letting the out-of-order packets through to reach the destination while the scanning is performed. In certain circumstances, the out-of-order packets may need to be modified before reaching the destination. There has been a lack of mechanisms to handle these situations.

SUMMARY OF THE DESCRIPTION

Techniques for reassembly-free rewriting of out-of-order data packet payload are described herein. In one aspect of the invention, in response to packets received at a network access device from a first network node destined to a second network node, the packets are stored in a buffer within the network access device if the packets need to be modified before sending the packets to the second network node. The original out-of-order packets are dropped and do not reach the second network node. The payloads of the packets stored in the buffer are modified and thereafter, the modified packets with the modified payloads are sent to the second network node.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for reassembly-free rewriting of out-of-order data packet payload are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, when a network access device (e.g., gateway device) receives out-of-order packets, a packet inspection logic of a network access device in general buffers the out-of-order packets for data pattern scanning purposes (e.g., antivirus, content filtering, etc.) while letting the original out-of-order packets through to reach the destination. For those protocols that require payload requiting functionality (e.g., modification of the payload), the packet inspection logic is configured to buffer at least a segment of data packets that needs to be modified, without letting at least that segment of the data packets through the network access device to reach the destination.

Specifically, for example, if during the in-order scanning some of the out-of-order packets' payload needs to be modified, the buffered out-of-order payload may be modified within the network access device and the new data integrity verification value (e.g., a checksum value) may be recalculated for the modified packets before the modified packets are sent to the destination. In one embodiment, the out-of-order packets are resent to the destination as soon as the "gap" (e.g., the segment that needs to be modified) is filled and in-order scanning of packets is completed. Note that the original packets of the buffered segment are not transmitted to the destination; only the modified version of the data segment will be resent to the destination after the modification.

That is, if all a network access device wants to do is the inspection of out-of-order packet payload, it is sufficient to buffer the out-of-order packets but still to send the out-of-order packets to the destination. However, when an out-of-order packet needs to be modified or rewritten, the original out-of-order packets needs to be dropped and only a modified (or unmodified) copy of the original out-of-order packet will be sent to the destination. Other configurations may exist.

Figure 1:
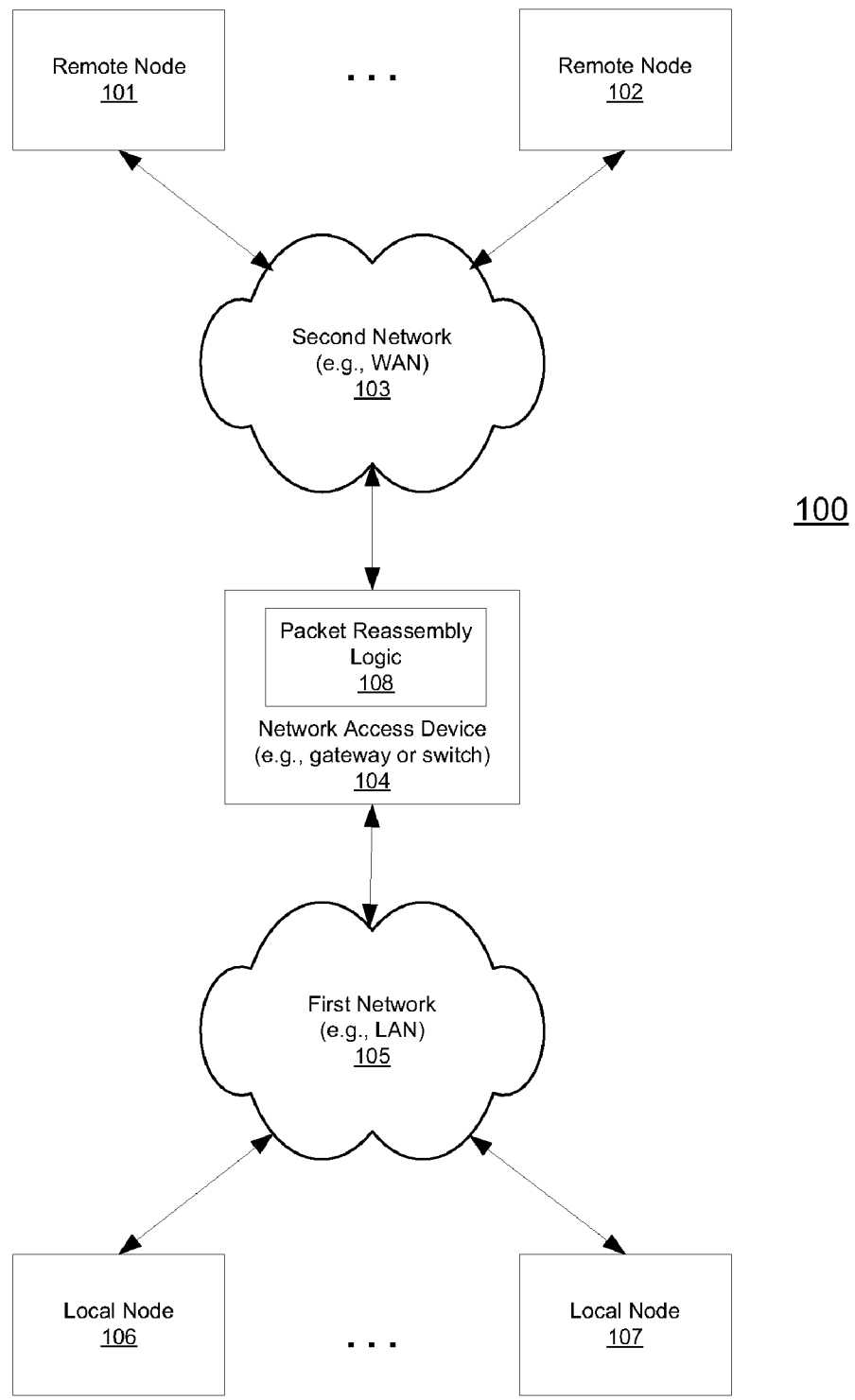
FIG. 1 is a block diagram illustrating an example of a network configuration according to one embodiment.

FIG. 1 is a block diagram illustrating an example of a network configuration according to one embodiment. Referring to FIG. 1, in one embodiment, the network configuration 100 includes a network access device 104 providing network access services for one or more network nodes 106-107 over a first network 105 which may be local area network (LAN). In order to access remote nodes 101-102 (e.g., Web servers or peer nodes) over a second network 103 (e.g., an external network), each of the nodes 106-107 has to go through the network access device 104 and optionally, a network service provider (e.g., an Internet service provider or ISP) in order to access remote nodes 101-102.

In one embodiment, the connection between the network access device 104 and the network 103 may be a wired connection. Alternatively, such a connection may be a wireless connection; for example, a satellite or an IEEE 802.1x compatible connection. The network 103 may be a wide area network (WAN), such as, for example, the Internet. The network 105 may be a home network using an IEEE 802.1x compatible protocol. Alternatively, the network 105 may be a local network within an organization (e.g., an Intranet). The network 105 may be a wired or wireless network, or a combination of both, using a variety of network protocols, such as, Ethernet and/or IEEE 802.1x compatible protocols, such as, for example, Wi-Fi and/or Bluetooth protocols. Wireless connections may include both RF and non-RF links, for example, an IR link. Wired connections may include both electrical and non-electrical links, for example, fiber optic links.

According to one embodiment, network access device 104 (e.g., gateway device) includes a packet reassemble logic 108, which may be implemented in hardware, software, or a combination of both, to reassemble certain packets that arrive in an out-of-order manner. For example, after a client and a server establish a TCP connection, the sender breaks the data into multiple TCP segments, puts them in multiple IP packets, and sends them to the recipient. These IP packets can easily arrive in an out-of-order manner (e.g., through one or more routers of one or more networks). In fact, two adjacent IP packets from the sender may take completely different routes in the network to reach the recipient. As a result, the time of their arrival, hence the order may be different and/or difficult to predict.

According to one embodiment, when packets arrive in an out-of-order manner at the network access device 104 (e.g., gateway device or IPS), a portion of the out-of-order packets may be forwarded to the intended destination (e.g., a protected host). Meanwhile, a copy of the out-of-order packets may be maintained within the network access device 104, which withholds at least one packet not to be transmitted to the destination. The network access device 104 may perform certain content scanning operations on the copy of the out-of-order packets, such as, for example, content filtering and/or antivirus/spyware operations. Since the destination only receives a portion of the packets while the network access device 104 is performing the content scanning operations, even if the packets contains any offensive data (e.g., virus, spyware, or certain content to be filtered), such packets would not be able to cause damage because the destination does not receive all packets and can not reassemble the out-of-order packets. If the network access device 104 determines that the packets may contain offensive data, the network access device 104 may drop the packets without sending the remaining portion or withheld portion of the packets to the destination. As a result, the offensive data contained within the packets would not cause damages at the destination. Further detailed information concerning the above packet scanning techniques can be found in a co-pending U.S. patent application Ser. No. 11/112,252, entitled "Method and Apparatus for Identifying Data Patterns in a File," filed Apr. 21, 2005, which has been assigned to a common assignee of this application, and which is incorporated by reference herein in its entirety.

According to one embodiment, network access device 104 includes packet reassemble logic 108 to reassemble the out-of-order packets for content scanning purposes including, for example, rewriting certain out-of-order packets as needed. For example, certain data packets may be required to insert, remove, or modify certain content (e.g., payload) prior to reaching the destination, which may be determined based on one or more policies. For example, certain outgoing emails of a corporation or entity may require automatically inserting certain disclaimer language before sending the emails outside of the local environment. Similarly, certain incoming content may require automatically inserting certain warning messages (e.g., virus or parental control messages, etc.)

For those out-of-order packets received at the network access device 104, if the network access device 104 determines that certain out-of-order packets need to be rewritten or modified, the packet reassemble logic 108 may buffer at least a segment of the packets within the network access device 104 without sending packets to the destination while performing the rewriting operations. Once the rewriting operations are completed, the modified packets are resent to the destination. In one embodiment, only a segment of the packets that is sufficient large enough to cover the area to be rewritten is buffered within the network access device 104. Note that the original packets of the buffered segment are not transmitted to the destination; only the modified version of the data segment will be resent to the destination after the modification.

That is, if all a network access device wants to do is the inspection of out-of-order packet payload, it is sufficient to buffer the out-of-order packets but still to send the out-of-order packets to the destination. However, when an out-of-order packet needs to be modified or rewritten, the original out-of-order packets needs to be dropped and only a modified (or unmodified) copy of the original out-of-order packet will be sent to the destination. Other configurations may exist.

Figure 2:
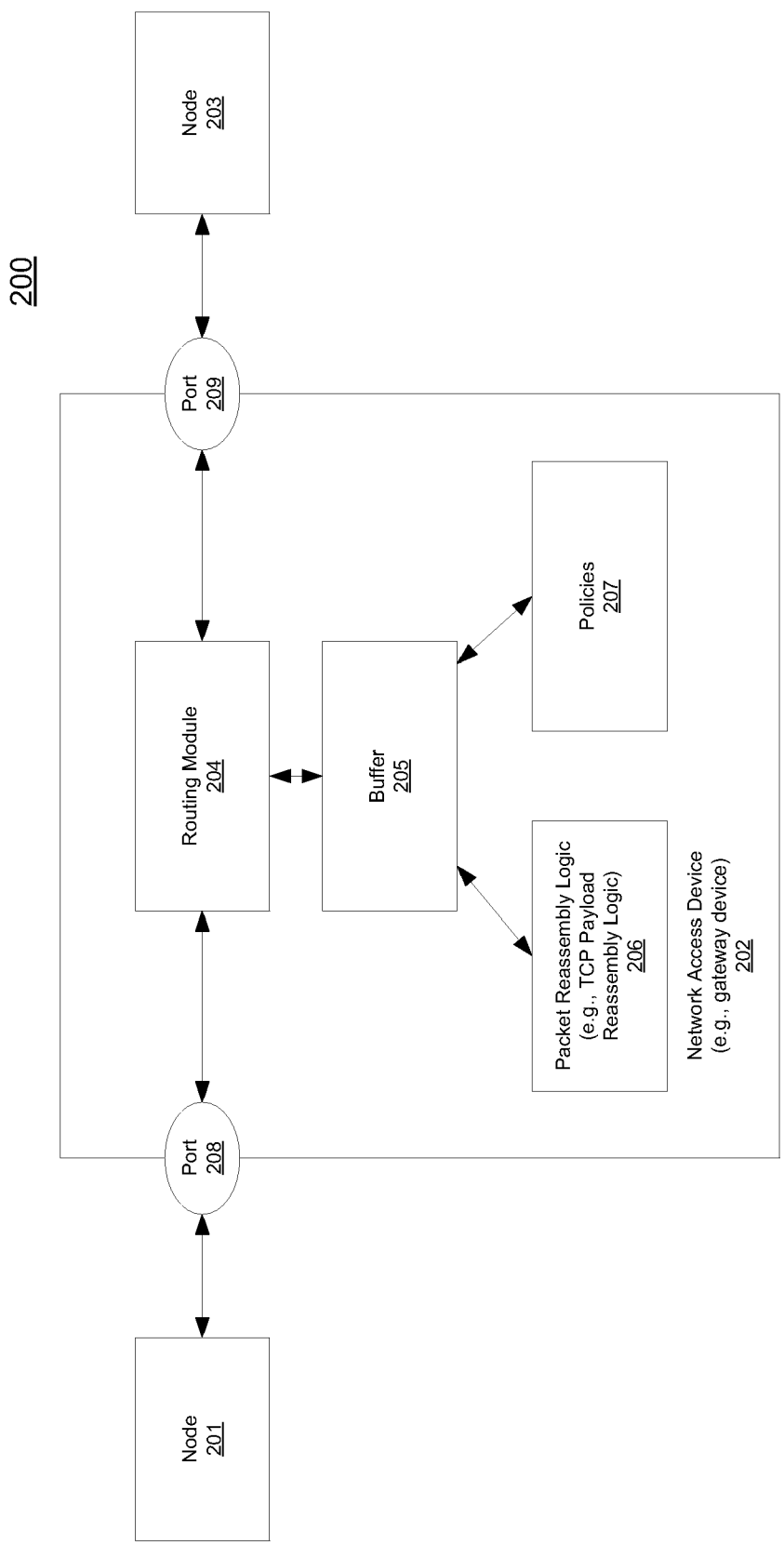
FIG. 2 is a block diagram of a content scanning system according to one embodiment of the invention.

FIG. 2 is a block diagram of a content scanning system according to one embodiment of the invention. For example, system 200 may be implemented as a part of system 100 of FIG. 1 and network access device 202 may be implemented as part of network access device 104 of FIG. 1. Referring to FIG. 2, system 200 includes, but is not limited to, a network access device 202 providing network interfaces among multiple network nodes such as nodes 201 and 203 via interfaces 208-209 (e.g., ingress and/or egress interfaces) over different networks (e.g., LAN or WAN).

In addition, network access device 202 includes a routing module 204, a buffer 205, packet reassemble logic 206, and one or more policies 207. The routing module 204 is used to route data packets between nodes 201 and 203 over one or more networks (e.g., LAN and/or WAN). In addition, routing module 204 may invoke packet reassemble logic 206 to perform content scanning operations (e.g., virus scanning, spyware scanning, and/or content filtering). The packet reassemble logic 206 may perform reassembly-free content scanning while the routing module 204 transmitting at least a portion of the content between nodes 201 and 203.

As described above, packets (e.g., inbound and/or outbound network traffics) may arrive at the network access device 202 in an out-of-order manner and payload of certain out-of-order packets may require being rewritten or modified.

Whether a packet needs to be modified may be determined based on one or more policies 207. For example, when the out-of-order packets are received at the network access device 202, a packet inspector (not shown) may inspect the out-of-order packets and based on the out-of-order packets (e.g., source/destination addresses, or certain data patterns), the packet inspector examines one or more policies 207 associated with the packet to determine whether the payload of the out-of-order packets need to be modified. If it is determined that the out-of-order packets do not need to be modified, a content scanning module (not shown) may buffer the out-of-order packets in buffer 205 to perform certain content scanning operations (e.g., virus, spyware, content filtering) while letting the out-of-order packets through the network access device 202 to reach the destination.

If, however, it is determined that the out-of-order packets need to be modified based on one or more policies 207, the out-of-order packets may be buffered in buffer 205, but without letting the out-of-order packets through the network access device 202 to reach the destination. In addition, packet reassemble logic 206 may be invoked to perform payload rewriting operations on the buffered out-of-order packets. In one embodiment, packet reassemble logic 206 may modify TCP payload of the out-of-order packets temporarily stored in buffer 205. Once the out-of-order packets have been modified by packet reassemble logic 206, a new data integrity verification value, such as, for example, a checksum value, used by the recipient to verify the integrity of the packets may be recalculated for the modified packets. Thereafter, the modified packets are sent to the destination including the new data integrity verification value. Note that only a segment of the out-of-order packets that is sufficiently large enough to cover a modification area of the packets only need to be buffered in buffer 205. Also note that the original packets of the buffered segment are not transmitted to the destination; only the modified version of the data segment will be resent to the destination after the modification. Also note that some or all of the components as shown in FIG. 2 may be implemented in hardware, software, or a combination of both.

Figure 3:
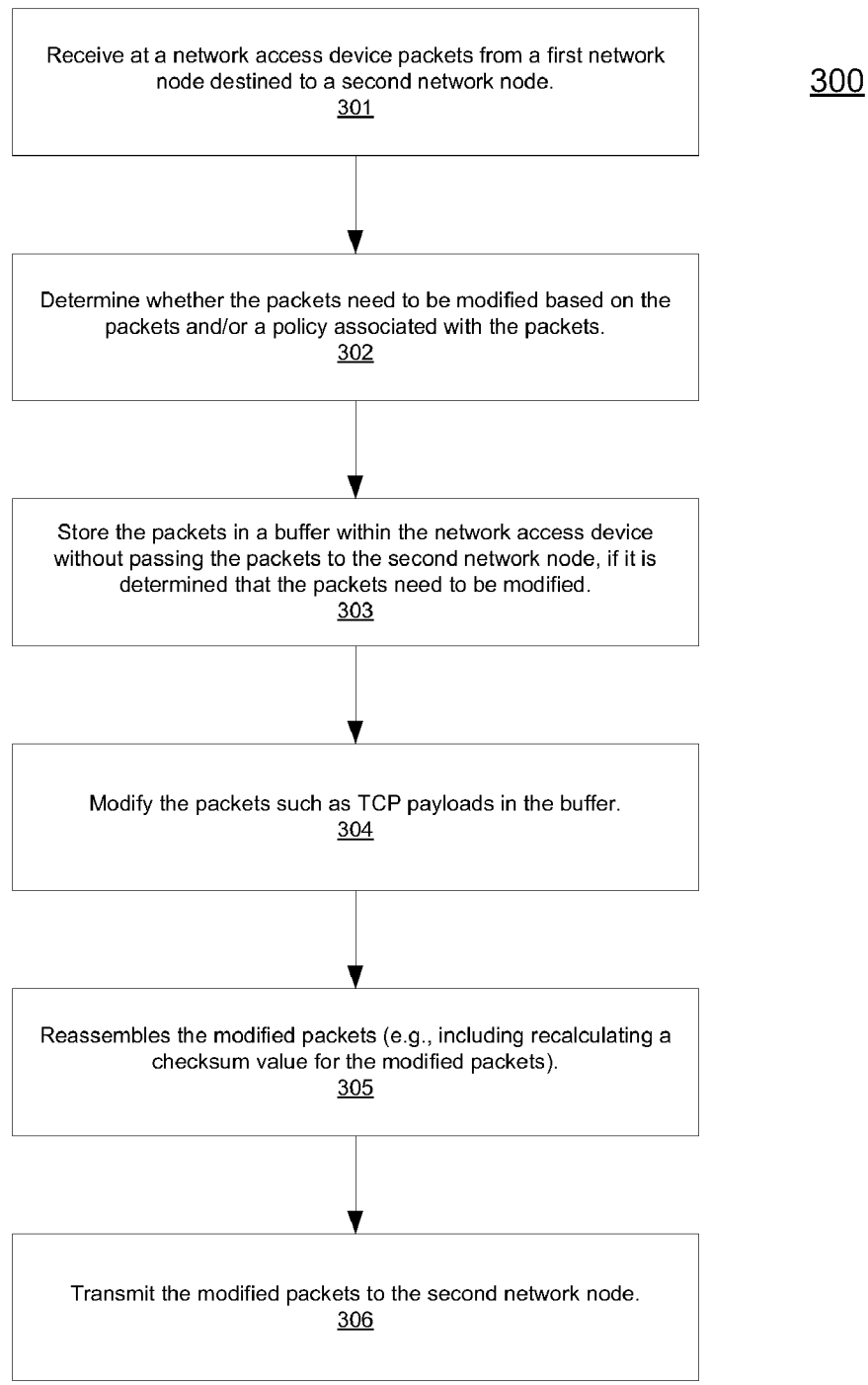
FIG. 3 is a flow diagram illustrating an example of a process for content scanning according to one embodiment of the invention.

FIG. 3 is a flow diagram illustrating an example of a process for content scanning according to one embodiment of the invention. Note that process 300 may be performed by processing logic, which includes hardware, software, or a combination of both. For example, process 300 may be performed by systems as shown in FIG. 1 and/or FIG. 2. Referring to FIG. 3, at block 301, processing logic of a network access device receives packets (e.g., out-of-order packets) from a first network node over a first network and destined to a second network node over a second network, which may be a LAN, a WAN, or a combination of several networks. At block 302, processing logic determines whether the packets need to be modified based on the packets and/or one or more policies associated with the packets. At block 303, the packets are temporarily stored in a buffer within the network access device without letting the packets through to reach the second network node, if it is determined that the packets need to be modified. In one embodiment, the determination of whether certain packets need to be modified may be performed based on one or more policies associated with the packets. Note that if it is determined that the packets do not need to be modified, the packets may be stored in the buffer while being sent to the second network node concurrently as described above. At block 304, the payload of the packets that have been temporarily stored in the buffer may be modified by packet reassemble logic and at block 305, the packet reassemble logic may recalculate the data integrity verification value (e.g., checksum value) for the modified packets. Thereafter, at block 306, the modified packets are transmitted to the second network node. Other operations may also be performed. Note that the original packets of the buffered segment are not transmitted to the destination; only the modified version of the data segment will be resent to the destination after the modification.

Figure 4:
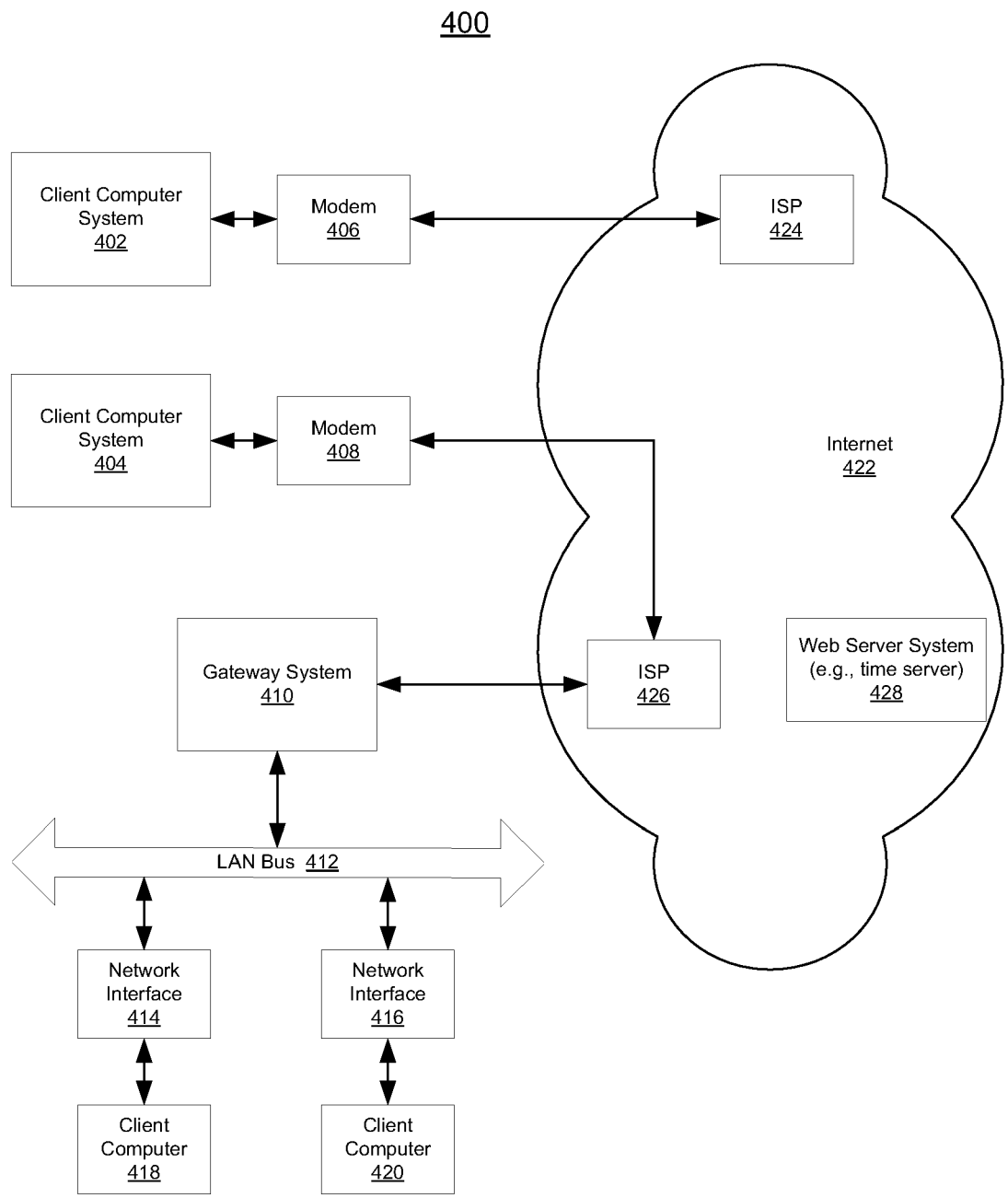
FIG. 4 is a diagram of a network of computer systems, which may be used with an embodiment of the invention.

FIG. 4 is a diagram of a network of computer systems, which may be used with an embodiment of the invention. As shown in FIG. 4, a network 400 includes a number of client computer systems that are coupled together through an Internet 422. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 422 is typically provided by Internet service providers (ISPs), such as the ISP 424, and the ISP 426. Users on client systems, such as the client computer systems 402, 404, 418, and 420, generally obtain access to the Internet through Internet service providers, such as ISPs 424 and 426. Access to the Internet may facilitate transfer of information (e.g., email, text files, media files, etc.) between two or more digital processing systems, such as the client computer systems 402, 404, 418, and 420 and/or a Web server system 428.

For example, one or more of the client computer systems 402, 404, 418, and 420 and/or the Web server 428 may provide document presentations (e.g., a Web page) to another one or more of the client computer systems 402, 404, 418, and 420 and/or Web server 428. For example, in one embodiment of the invention, one or more client computer systems 402, 404, 418, and 420 may request to access a document that may be stored at a remote location, such as the Web server 428. In the case of remote storage, the data may be transferred as a file (e.g., download) and then displayed (e.g., in a window of a browser) after transferring the file. In another embodiment, the document presentation may be stored locally at the client computer systems 402, 404, 418, and/or 420. In the case of local storage, the client system may retrieve and display the document via an application, such as a word processing application, without requiring a network connection.

The Web server 428 typically includes at least one computer system to operate with one or more data communication protocols, such as the protocols of the World Wide Web and, as such, is typically coupled to the Internet 422. Optionally, the Web server 428 may be part of an ISP which may provide access to the Internet and/or other network(s) for client computer systems. The client computer systems 402, 404, 418, and 420 may each, with appropriate Web browsing software, access data, such as HTML document (e.g., Web pages), which may be provided by the Web server 428.

The ISP 424 provides Internet connectivity to the client computer system 402 via a modem interface 406, which may be considered as part of the client computer system 402. The client computer systems 402, 404, 418, and 420 may be a conventional data processing system, such as a desktop computer, a "network" computer, a handheld/portable computer, a cell phone with data processing capabilities, a Web TV system, or other types of digital processing systems (e.g., a personal digital assistant (PDA)).

Similarly, the ISP 426 provides Internet connectivity for the client computer systems 402, 404, 418, and 420. However, as depicted in FIG. 4, such connectivity may vary between various client computer systems, such as the client computer systems 402, 404, 418, and 420. For example, as shown in FIG. 4, the client computer system 404 is coupled to the ISP 426 through a modem interface 408, while the client computer systems 418 and 420 are part of a local area network (LAN). The interfaces 406 and 408, shown as modems 406 and 408, respectively, may represent an analog modem, an ISDN modem, a DSL modem, a cable modem, a wireless interface, or other interface for coupling a digital processing system, such as a client computer system, to another digital processing system.

The client computer systems 418 and 420 are coupled to a LAN bus 412 through network interfaces 414 and 416, respectively. The network interface 414 and 416 may be an Ethernet-type, asynchronous transfer mode (ATM), or other type of network interface. The LAN bus is also coupled to a gateway digital processing system 410, which may provide firewall and other Internet-related services for a LAN. The gateway digital processing system 410, in turn, is coupled to the ISP 426 to provide Internet connectivity to the client computer systems 418 and 420. The gateway digital processing system 410 may, for example, include a conventional server computer system. Similarly, the Web server 428 may, for example, include a conventional server computer system.

In one embodiment, the local area network 412 may be local wireless network (e.g., a home network) and the gateway 410 may include a wireless access point (also referred to as a base station) to one or more clients 418 and 420 using a variety of wireless networking protocols; for example, the IEEE 802.xx protocols including Wi-Fi and/or Bluetooth protocols. In a further embodiment, the gateway 410 may access the server 428 via dialup network services using a modem.

According to one embodiment, techniques of content scanning (e.g., antivirus, anti-spyware, or content filtering), described above may be implemented with any of the network access devices, such as, modems 406 and 408, and/or gateway 410.

Figure 5:
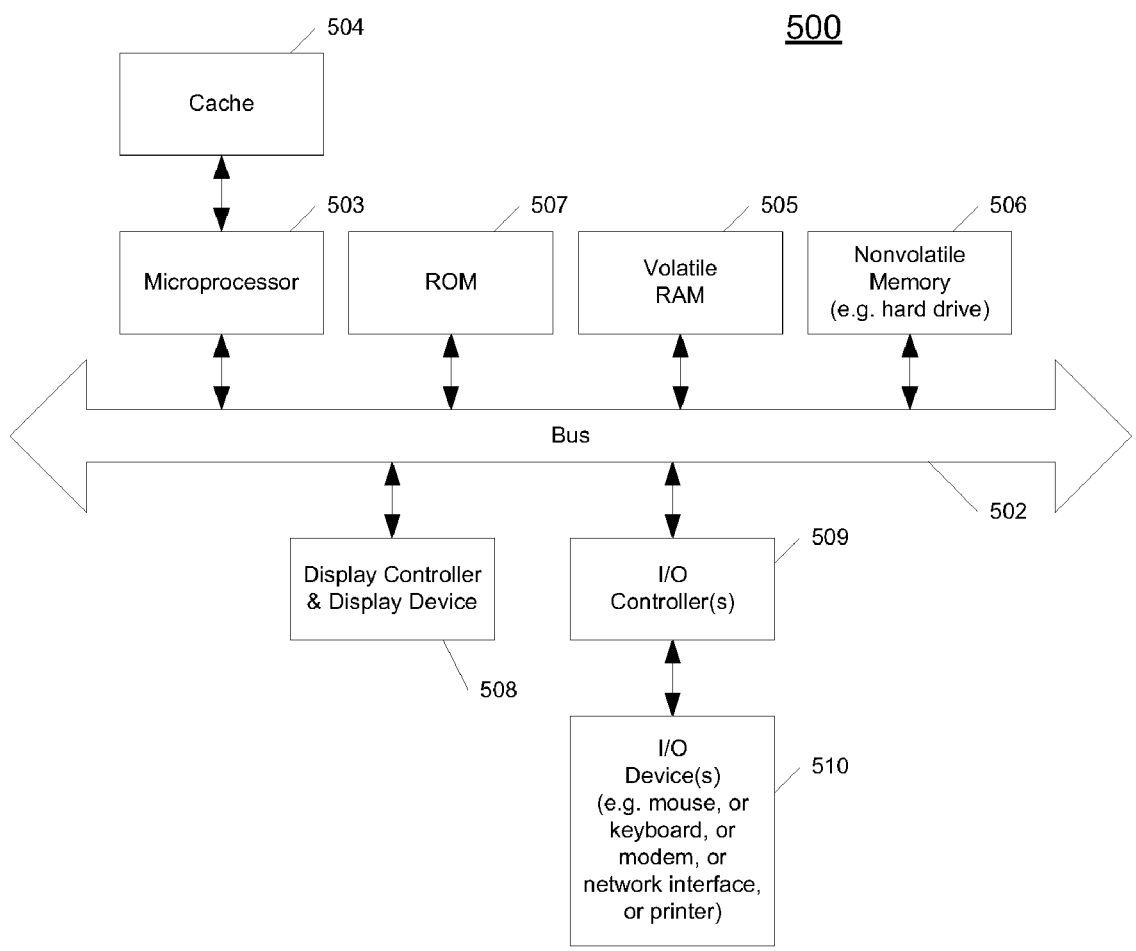
FIG. 5 is a block diagram of a digital processing system which may be used with one embodiment of the invention.

FIG. 5 is a block diagram of a digital processing system which may be used with one embodiment of the invention. For example, the system 500 shown in FIG. 5 may be used as a client computer system such as clients 404-405 of FIG. 4. Alternatively, the exemplary system 500 may be implemented as a network access device 402, etc.

Note, that while FIG. 5 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 5 may, for example, be an Apple Macintosh computer or an IBM compatible PC.

As shown in FIG. 5, the computer system 500, which is a form of a data processing system, includes a bus 502 which is coupled to a microprocessor 503 and a ROM 507, a volatile RAM 505, and a non-volatile memory 506. The microprocessor 503, which may be, for example, an Intel processor or a PowerPC processor, is coupled to cache memory 504 as shown in the example of FIG. 5. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices. Other components may also be included.

Thus, techniques for reassembly-free rewriting of out-of-order data packet payload have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for processing network data packets, comprising:
   in response to packets received at a network access device from a first network node over a first network destined to a second network node over a second network, determining whether the packets need to be modified based on one or more policies associated with the packets maintained by the network access device, wherein the packets are out-of-order network packets transmitted from the first network node;
   passing the packets to the second network node without buffering the packets within the network access device if the packets do not need to be modified; and
   if the packets need to be modified,
      storing the packets in a buffer within the network access device before sending the packets to the second network node,
      modifying payloads of the packets stored in the buffer, and
      transmitting the packets with the modified payloads to the second network node, wherein original packets without modified are not transmitted to the second network node.

2. The method of claim 1, wherein the modified payloads of the packets are TCP payloads of the packets.

3. The method of claim 1, wherein storing the packets in the buffer comprises buffering a segment of the packets sufficient enough to cover an area that needs to be modified.

4. The method of claim 3, further comprising passing subsequent packets to the second network node without buffering once the segment of the packets has been buffered and modified, and sent to the second network node.

5. The method of claim 1, further comprising calculating a checksum value for the modified packets prior to sending the modified packets to the second network node, wherein the checksum value is used to verify the modified packets by the second network node.

6. A non-transitory machine-readable medium having instructions stored therein, which when executed by a processor, cause the processor to perform a method for processing network data packets, the method comprising:
   in response to packets received at a network access device from a first network node over a first network destined to a second network node over a second network, determining whether the packets need to be modified based on one or more policies associated with the packets maintained by the network access device, wherein the packets are out-of-order network packets transmitted from the first network;
   passing the packets to the second network node without buffering the packets within the network access device if the packets do not need to be modified; and
   if the packets need to be modified,
      storing the packets in a buffer within the network access device before sending the packets to the second network node,
      modifying payloads of the packets stored in the buffer, and
      transmitting the packets with the modified payloads to the second network node, wherein original packets without modified are not transmitted to the second network node.

7. The non-transitory machine-readable medium of claim 6, wherein the modified payloads of the packets are TCP payloads of the packets.

8. The non-transitory machine-readable medium of claim 6, wherein storing the packets in the buffer comprises buffering a segment of the packets sufficient enough to cover an area that needs to be modified.

9. The non-transitory machine-readable medium of claim 8, wherein the method further comprises passing subsequent packets to the second network node without buffering once the segment of the packets has been buffered and modified, and sent to the second network node.

10. The non-transitory machine-readable medium of claim 6, wherein the method further comprises calculating a checksum value for the modified packets prior to sending the modified packets to the second network node, wherein the checksum value is used to verify the modified packets by the second network node.

11. A network access device for routing network data packets, comprising:
   an ingress interface to receive packets from a first network node over a first network destined to a second network node over a second network, wherein the packets are out-of-order network packets;
   a policy module to maintain one or more policies to determine whether the packets need to be modified;
   a buffer coupled to temporarily store the packets if the packets need to be modified before sending the packets to the second network node, without sending the packets to the second network node;
   a packet reassembly logic coupled to the buffer to modify payloads of the packets stored in the buffer if the packets need to be modified, wherein the packet reassembly logic is configured to pass the packets to the second network node without buffering the packets in the buffer if the packets do not need to be modified; and an egress interface to transmit the packets having the modified payloads to the second network node over the second network, wherein original packets without modified are not transmitted to the second network node, if the packets need to be modified.

12. The network access device of claim 11, wherein the buffer is configured to store a segment of the packets sufficient enough to cover an area that needs to be modified.

13. The network access device of claim 12, wherein the packet reassembly logic is configured to pass subsequent packets to the second network node without buffering once the segment of the packets has been buffered and modified, and sent to the second network node.

14. The network access device of claim 11, wherein the packet reassembly logic is configured to calculate a checksum value for the modified packets prior to sending the modified packets to the second network node, wherein the checksum value is used to verify the modified packets by the second network node.

* * * * *